(12) United States Patent
Herbert et al.

(10) Patent No.: US 8,206,486 B2
(45) Date of Patent: Jun. 26, 2012

(54) DROSS COOLING SYSTEM AND COOLING METHOD

(75) Inventors: James Herbert, Downingtown, PA (US); Jorge Fernandez, Downingtown, PA (US); Andy Gibbs, Derby (GB)

(73) Assignee: Altek, L.L.C, Exton, PA (US)

( * ) Notice: Subject to any disclaimer, the term of this patent is extended or adjusted under 35 U.S.C. 154(b) by 103 days.

(21) Appl. No.: 12/784,767

(22) Filed: May 21, 2010

(65) Prior Publication Data
US 2011/0283833 A1 Nov. 24, 2011

(51) Int. Cl.
*C22B 21/06* (2006.01)
(52) U.S. Cl. ............................. 75/672; 75/686
(58) Field of Classification Search ...................... 75/672
See application file for complete search history.

(56) References Cited

U.S. PATENT DOCUMENTS

| | | |
|---|---|---|
| 4,386,956 A | 6/1983 | Roth et al. |
| 4,527,779 A | 7/1985 | Roth et al. |
| 4,540,163 A | 9/1985 | van Linden et al. |
| 4,575,056 A | 3/1986 | Julliard et al. |
| 5,397,104 A * | 3/1995 | Roth ............................ 266/227 |
| 5,669,957 A | 9/1997 | Roth |
| 5,788,918 A | 8/1998 | Bramley |
| 5,811,056 A | 9/1998 | Bramley |
| 5,829,512 A | 11/1998 | August |
| 6,096,260 A | 8/2000 | Schirk |
| 6,136,263 A | 10/2000 | Bramley |
| 6,228,319 B1 * | 5/2001 | Roth et al. ................... 266/205 |
| 6,313,990 B1 | 11/2001 | Cheon |
| 7,157,042 B2 * | 1/2007 | Roth ............................ 266/205 |
| 2001/0011788 A1 | 8/2001 | Roth et al. |
| 2005/0098930 A1 | 5/2005 | Roth |

FOREIGN PATENT DOCUMENTS

| | | |
|---|---|---|
| EP | 1640464 | 3/2006 |
| WO | 2005106054 | 11/2005 |

* cited by examiner

*Primary Examiner* — George Wyszomierski
*Assistant Examiner* — Tima M McGurthry Banks
(74) *Attorney, Agent, or Firm* — Renner, Otto, Boisselle & Sklar, LLP

(57) ABSTRACT

Embodiments of an aluminum dross cooling head are disclosed. The cooling cooperates with a material container encapsulate dross and reduce thermiting of the dross. In one embodiment, the cooling head also serves as a compression head when forced into the dross by a cooperating dross press assembly.

35 Claims, 10 Drawing Sheets

DROSS COOLING SYSTEM AND COOLING METHOD

FIELD OF THE INVENTION

This invention relates to the cooling of dross and more particularly to a cooling system and cooling method for more effectively cooling aluminum dross resulting from an aluminum recycling process.

BACKGROUND OF THE INVENTION

Dross compression apparatus are commonly used to recover non-ferrous metals, particularly aluminum, from dross which has been skimmed from a furnace. Aluminum dross is a combination of aluminum metal and aluminum oxides, as well as other possible components such as various oxides, nitrates and carbides. Aluminum dross is a by-product of an aluminum melting operation. Generally the dross floats on top of the molten aluminum metal in the furnace. Aluminum dross may contain anywhere from ten percent to ninety percent aluminum depending on the particular processing technique and the type of furnace. Therefore, the dross in an aluminum melting operation includes a significant amount of aluminum metal which is considered a valuable resource to be recovered.

A factor to consider during the cooling of aluminum dross, with or without the recovery of aluminum, is thermiting of the dross. Thermiting, or thermite reaction, of the dross is exothermic oxidation of aluminum metal in the dross.

SUMMARY OF THE INVENTION

According to one aspect of the disclosure, a method of cooling aluminum dross includes placing the dross into a receptacle of a material container; and placing a cooling head on top of the dross so that a downwardly projecting portion of the cooling head engages the dross and locally deforms the dross under the weight of the cooling head; wherein: the cooling does not include the use of a dross press assembly to exert mechanical force to the dross prior to placing the cooling head on the dross; and the cooling head seals against the material container to at least partially encapsulate the dross and extinguish oxidation of the dross, and the seal is formed by engagement of an upper rim of the material container into a channel of the cooling head.

According to another aspect of the disclosure, a method of cooling aluminum dross includes placing the dross into a receptacle of a material container; pressing the dross with a dross press head that is part of a dross press assembly so that an indentation corresponding to a shape of the dross press head is formed in the dross; and placing a cooling head on top of the dross so that a downwardly projecting portion of the cooling head engages the pressed dross; wherein: the cooling head is shaped to make physical and thermal contact with a surface of the indentation in the dross; and the cooling head seals against the material container to at least partially encapsulate the dross and extinguish oxidation of the dross, and the seal is formed by engagement of an upper rim of the material container into a channel of the cooling head.

According to another aspect of the disclosure, an aluminum dross cooling head for cooling aluminum dross that is placed in a material container, the material container having an upper rim, includes a plate-like upper portion; a protrusion extending downward from the upper portion, the protrusion configured to make physical and thermal contact with the dross; and a channel circumferentially formed with a perimeter of the upper portion and surrounding the protrusion, the channel configured to receive the upper rim of the material container during cooling of the dross with the cooling head so that the cooling head and material container encapsulates the dross and reduces thermiting of the dross by extinguishment.

According to yet another aspect of the disclosure, a method of cooling aluminum dross includes placing the dross into a receptacle of a material container; placing the material container containing the dross into a dross press assembly; placing a compression and cooling head that is separate from the dross press assembly onto the dross; bringing a head of a force applicator of the dross press assembly into contact with the compression and cooling head and compressing the dross by downwardly forcing the force applicator head against the compression and cooling head so that the compression and cooling head travels into the dross and into a seating position in the receptacle, wherein a shape of the force applicator head cooperates with a shape of a receiving structure of the compression and cooling head to allow the compression and cooling head to self align with the dross and material container during compression of the dross; removing the material receptacle with seated compression and cooling head from the dross press assembly after compressing; and cooling the dross while the compression and cooling head is in the seated position.

According to still another aspect of the disclosure, an aluminum dross compression and cooling head for compressing and cooling aluminum dross that is placed in a material container includes a downward projection for engaging the dross; a receiving structure configured to receive a correspondingly shaped head of a force applicator of a dross press assembly so that when downward force is applied by the force application head against the receiving structure, the receiving structure cooperates with the shape of the force applicator head to allow the compression and cooling head to self align with the dross and the material container during compression of the dross, the force applicator head and the compressing and cooling head being separate from each other; and a seating surface for engaging the material container following compression of the dross.

According to another aspect of the disclosure, a dross press assembly for compressing aluminum dross that is placed in a material container includes a force applicator; and a force application head attached to the force applicator, the head shaped correspondingly with a receiving structure of a compressing and cooling head so that when downward force is applied by the force application head against the receiving structure, the receiving structure cooperates with the shape of the force applicator head to allow the compression and cooling head to self align with the dross and the material container during compression of the dross, the force applicator head and the compressing and cooling head being separate from each other.

These and other features, aspects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DETAILED DESCRIPTION OF THE INVENTION

Figure 1:
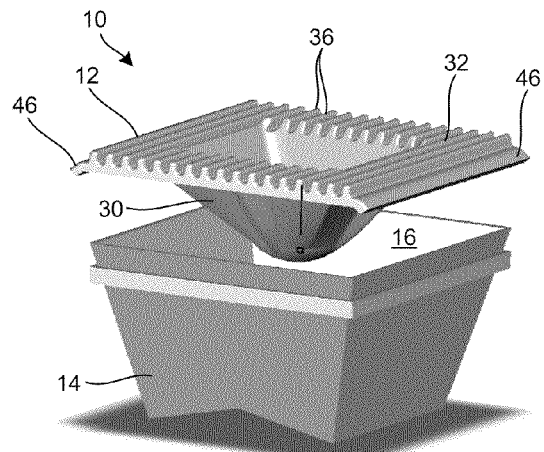
FIG. 1 is a perspective view of a cooling system in accordance with one exemplary embodiment of the present invention.

Referring now in detail to the drawings wherein like reference numerals are used to indicate like parts, FIGS. 1 through 7 show various exemplary embodiments of a cooling system 10. The cooling system 10 may be used to cool a variety of materials including, for example, aluminum dross, dross from other metal processing, salt cake and so forth. The material may be residue obtained following the recovery of molten aluminum from a recycling operation or from some other industrial process, such as, without limitation, by-products from a magnesium processing system and chloride flux derived from a paper pulp processing system. As will be appreciated, these materials are preferably cooled prior to disposal or further processing. The cooling system 10 is arranged to reduce an amount of thermiting that takes place when cooling aluminum dross.

The cooling system 10 includes a cooling head 12. The cooling head 12 may be placed on a material container 14. The cooling head 12 and material container 14 have corresponding geometries to cooperate with one another in the manners described herein. Depending on the application, the material container 14 may be referred to as a dross collector, a skim pot, and so forth. The cooling head 12 and/or the material container 14 may be made from any appropriate material, including cast alloy steel or grey iron. Grey iron may be cheaper than alloy steel, but alloy steel may be more resistant to surface checking and cracking and, as a result, have a longer life-span. Alloy steel also may more efficiently cool the material. Alternatively, the cooling head 12 and/or the material container 14 may be made from ceramic materials, or may include ceramic components (e.g., a ceramic liner).

Figure 3:
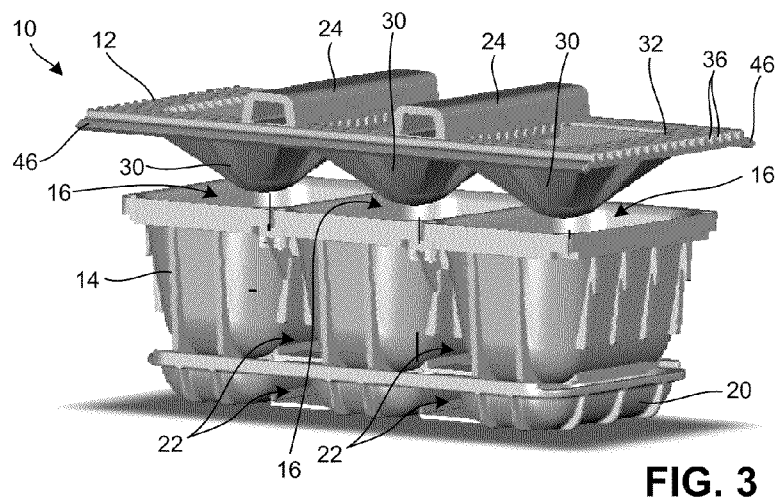
FIG. 3 is a perspective view of a multi-chamber cooling system in accordance with another exemplary embodiment of the present invention.
Figure 4:
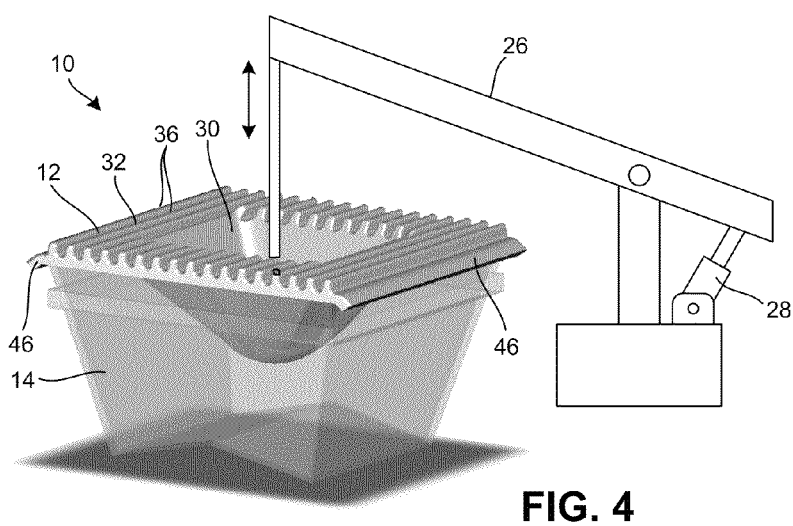
FIG. 4 is a perspective view of a cooling system in accordance with another exemplary embodiment of the present invention.

The material container 14 may have a receptacle 16 for the material to be cooled. In the embodiment of FIG. 3, the material container 14 has plural receptacles 16. In one embodiment, the receptacle 16 and/or a portion of the cooling head 12 that projects into the receptacle 16 may be substantially hemispheric shaped. Of course, other shapes are possible.

In some configurations, the material container 14 may be provided with one or more openings 18 (best shown in FIG. 6) at the bottom of the receptacle 16 to allow molten aluminum (or other flowable material) to pass by gravity and/or under the pressure from the cooling head 12. The substance passing through the openings 18 may be collected in a collector pan 20 disposed under the material container 14. Depending on the industrial application, the collector pan 20 may be referred to as a drain pan or a sow mold.

The material container 14 and/or the collector pan 20 may include passages 22 that accept forks of a forklift truck for transporting the material container 14 and/or collector pan 20. In one embodiment, the cooling head 12 may include tubular members 24 for receipt of the forks of a forklift truck for transporting the cooling head 12 and/or positioning the cooling head 12 on the material container 14. In another embodiment, the cooling head 12 may be wider than the material container 14 and the forks of the forklift truck may move and/or position the cooling head 12 by engaging portions of the cooling head 12 that overhang the material container 14. In yet other embodiments, the cooling head 12 may be moved and/or positioned with respect to the material container 14 using a hoist or crane. The cooling head 12 may include a hook(s), ring(s) or other member for facilitating coupling of the cooling head 12 to the hoist or crane by way of, for example, a rigid member, a cable, a chain, a hook, and so forth. In one embodiment, such as the embodiment shown in FIG. 4, the cooling head 12 may be coupled to a lever arm 26. The lever arm 26 may be raised and lowered (and possibly swung) to position the cooling head 12 with respect to the material container 14. In the illustrated embodiment, the elevation of the lever arm 26 is controlled by a hydraulic piston 28, but other mechanisms for positioning the lever arm 26 are possible. The lever arm 26 may connect directly to the cooling head 12 or may connect to the cooling head 12 by way of a rigid member, a cable, a chain, a hook, a ball joint, a spring and/or some other member. The lever arm 26 may be mounted to a stationary frame.

The cooling head 12 may have a downwardly projecting protrusion 30. As illustrated, a plate-like member that forms an upper portion 32 of the cooling head 12 has a depression, or well, that forms the protrusion 30 by protruding downwardly for making thermal contact with the material. The upper surface of the upper portion 32 may be depressed so that the lower surface of the protrusion 30 is convexly curved and is disposed below the surrounding flange-like members formed by the upper portion 32. In some embodiments, the protrusion 30 may be substantially hemispheric shaped. When the cooling head 12 is positioned on the material container 14, the protrusion 30 may enter the receptacle 16 through an open top of the material container 14 and the protrusion 30 may contact the material contained in the material container 14. The cooling head 12 may include multiple protrusions 30, such as a protrusion 30 for each receptacle 16 of a multi-receptacle 16 material container 14 (e.g., the cooling head 12 and the material container 14 of FIG. 3).

Heat from material contained in the material container 14 may be transferred to the protrusion 30. A substantial amount of the transferred heat may be conveyed to the upper portion 32 of the cooling head 12. In one embodiment, the upper portion 32 of the cooling head 12 may be a plate that surrounds the protrusion 30. In the illustrated embodiments, the upper portion 32 is open so that a recess formed by the protrusion 30 is open to the environment. This open recess, or well, creates surface area for efficient heat transfer and provides a lighter cooling head 12 relative to a cooling head 12 that has a solid protrusion 30 or a covered protrusion 30. The surface of the well (which is the upper surface of the protrusion 30) may be relatively smooth as shown or have structural elements (e.g., ribs).

Figure 5:
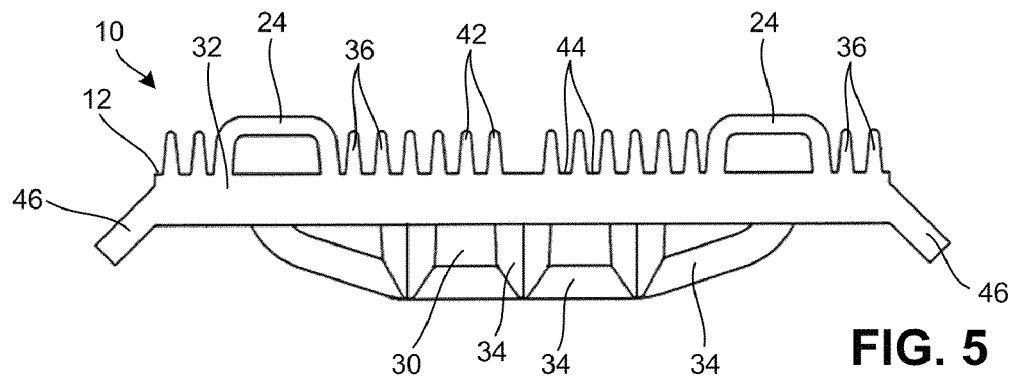
FIG. 5 is a front view of a cooling head in accordance with an exemplary embodiment of the present invention.
Figure 6:
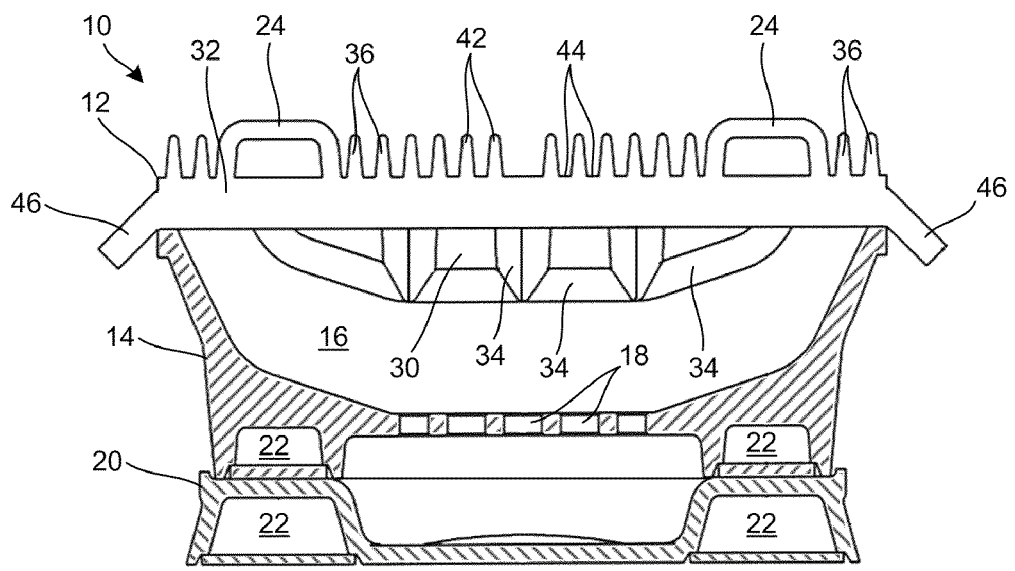
FIG. 6 is a front view of a cooling system in accordance with an exemplary embodiment of the present invention where a skim pot and a sow mold are shown in section.
Figure 7:
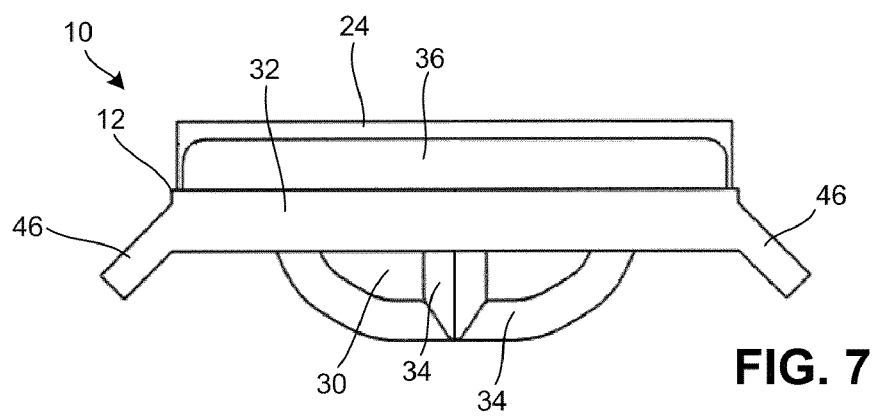
FIG. 7 is a side view of a cooling head in accordance with another exemplary embodiment of the present invention.

The lower surface of the protrusion 30 may be relatively smooth as shown in FIGS. 1 through 4. Alternatively, the lower surface of the protrusion 30 may have structural elements, such as ribs 34 as shown in FIGS. 5-7. As used herein, the term rib means any projection or shape which forms a projection, raised area, ridge, corner or non-continuity on a surface. Ribs also may be referred to as fins or flanges. The ribs 34 may extend into the material in the material container 14 to help dissipate and/or transfer the heat in the material. Also, such ribs may help increase the compressive force on the material. In the exemplary embodiments of FIGS. 1-7, the cooling head 12 is placed on the material container 14 and any compression of the material in the material container 14 is achieved solely by the weight of the cooling head 12 acting on the material. In other embodiments, downward force may be applied to the cooling head 12 to achieve compression of the material. Such downward force may be applied, for example, using a press assembly, as described in greater detail below. In other embodiments, downward force may be applied by a forklift truck or the lever arm 26 used to move the cooling head 12.

Figure 2:
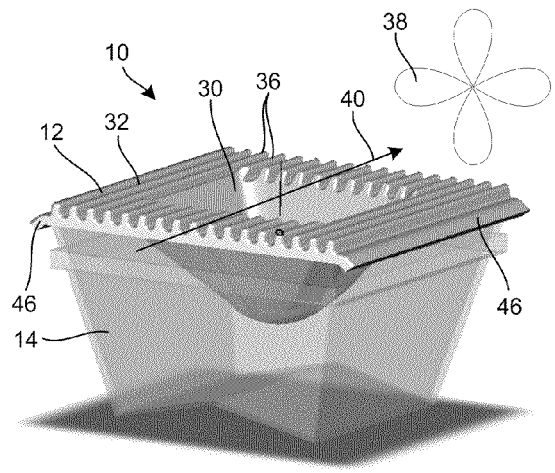
FIG. 2 is a perspective view of a cooling system in accordance with another exemplary embodiment of the present invention.

To assist in dissipating and/or radiating heat from the material to the environment, the cooling head 12 may include structural elements on the upper surface of the upper portion 32. For instance a series of ribs 36 may be present. The tubular member 24, if present, also may serve to assist in dissipating and/or radiating heat. In effect, the ribs 36 and/or other elements on the top of the cooling head 12 may help to remove heat from the cooling head 12. To enhance the removal of heat from the cooling head 12, cooling air may be directed across the top of the cooling head 12. For instance, as shown in FIG. 2, a blower 38 or other ventilation system may draw air across the top of the cooling head 12 as graphically portrayed by arrow 40. In other embodiments, the air may be blown across the top of the cooling head 12. Plural cooling systems 10 may be arranged in close proximity to each other such that air may be directed across multiple cooling heads 12 to assist in cooling material that is dispensed into multiple corresponding material containers 14.

The ribs 36 on the cooling head 12 may extend generally in the same direction, such as from the front of the cooling head 12 toward the back of the cooling head 12 (e.g., as shown in FIGS. 1-2 and 4-7) or from one side to another side (e.g., as shown in FIG. 3). The directionality of the ribs may help channel cooling air that is directed across the top of the cooling head 12. For instance, cooling air may be directed along the peaks 42 and valleys 44 of the ribs 36 as best illustrated in FIGS. 5 and 6. Any suitable nozzle assembly, blower, manifold, fan or air circulator may be used to create an air flow to assist in removing heat from the cooling head 12.

A lower surface of upper portion 32 may be configured to engage an upper edge of material container 14. The interface (or closure) between the cooling head 12 and material container 14 may reduce the flow of gasses into the receptacle and reduce oxidation of the material in the material container 14 during cooling. As indicated, edge portions of the upper portion 32 may overhang the material container 14. Overhanging portions 46 may be bent downward to enhance the sealing effect, to divert air flow and/or to provide a lip to assist in stabilizing the cooling head 12 in embodiments where a forklift is used to lift the underside of the cooling head 12. Downwardly bending and overhanging portions 46 may be present on any combination of the front edge, the rear edge, the left side edge and the right side edge.

The well formed by the protrusion 30 may be filled with a material to assist in weighting the cooling head 12 and/or adjusting the cooling behavior of the cooling head 12. For instance, sand, metal shot, plates or a conforming metal insert may be placed in the well. Also, a cooling apparatus may be placed in the well. In other embodiments a coolant (in addition to or instead of the above-described air) may be directed across the surface of the recess and/or the ribs 36. For instance, water or oil may be circulated with respect to the cooling head 12.

In another embodiment, a vibrator may be placed in the well or on top of the cooling head 12. The vibrator may be activated to shake the cooling head 12 to assist in compaction of dross and promote the draining of metal into the collector pan 20.

In an exemplary industrial application to process aluminum dross, a compression apparatus with integrated compression head may be used to compress dross in a time period of about an hour or less. An exemplary compression machine for this purpose is disclosed in, for example, U.S. Pat. No. 5,397,104, the disclosure of which is incorporated herein by reference in its entirety. Then, the container in which the dross was compressed may be moved from the compression apparatus and a cooling head (e.g., the cooling head 12) may be placed on the moved dross and dross container to further cool the dross for a period of time, such as about one hour to about two hours. This allows for increased use of the compression apparatus for compression, which leads to increased throughput and process efficiencies.

Figure 8:
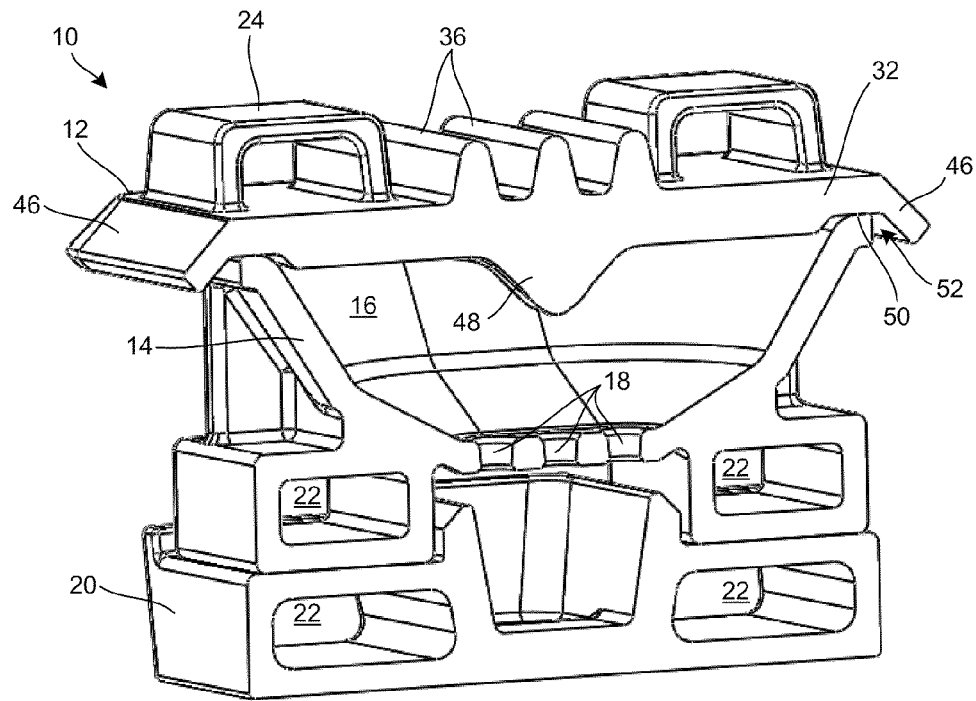
FIG. 8 is an oblique view showing a cross-section of a cooling system in accordance with still another exemplary embodiment of the present invention.

With additional reference to FIG. 8, shown is another embodiment of the cooling system 10. Similar to the foregoing cooling systems 10, the cooling system 10 of FIG. 8 includes a cooling head 12, a material container 14, and a collection pan 20. Features that the cooling system 10 of FIG. 8 has in common with the foregoing cooling systems 10 will not be described in detail.

The cooling head 12 of FIG. 8 includes a generally planar plate that forms the upper portion 32. The upper portion 32 does not have a depression or well that forms the protrusion. Rather, the cooling head has a downward protrusion 48 that projects from a lower side of the upper portion 32. The protrusion 48, which is preferably solid, makes thermal contact with the dross. In addition, and similar to the above-described cooling heads 12, the cooling head 12 may include ribs 36 and tubular members 24 that extend upward from an upper side of the upper portion 32. Since a well is not present in the cooling head 12, the ribs 34 may traverse a central portion of the cooling head 12.

Engagement of the cooling head 12 of FIG. 8 against an upper rim 50 of the material container 14 may form a seal and may serve to encapsulate the dross in a volume formed by the material container 14 and cooling head 12. The encapsulation and sealing may reduce fume release and dusting. The cooling head 12 may be structurally arranged to form the seal. For example, in the illustrated embodiment, the lower side of the upper portion 32 may include a channel 52 around the perimeter of the cooling head 12 into which the rim 50 is received. In one embodiment, the channel 52 is formed by making the upper portion 32 in the area of the channel 52 thinner than the upper portion 32 located inside the channel 52. In addition, the cooling head 12 may be larger than the material container 14 in the lengthwise and widthwise directions so that the upper portion 32 overhangs the material container 14 with overhanging portions 46. The overhanging portions 46 may be bent downward to establish the channel 52 between the overhanging portions 46 and the thicker portion of the upper portion 32. In the embodiment of FIG. 8, the overhanging portions 46 are bent downward at an angle of about 45 degrees. This angle may be less than or greater than 45 degrees. For example, with additional reference to FIG. 21, a cooling head 12 is shown with overhanging portions that are bent downward at angle of about 90 degrees.

Figure 21:
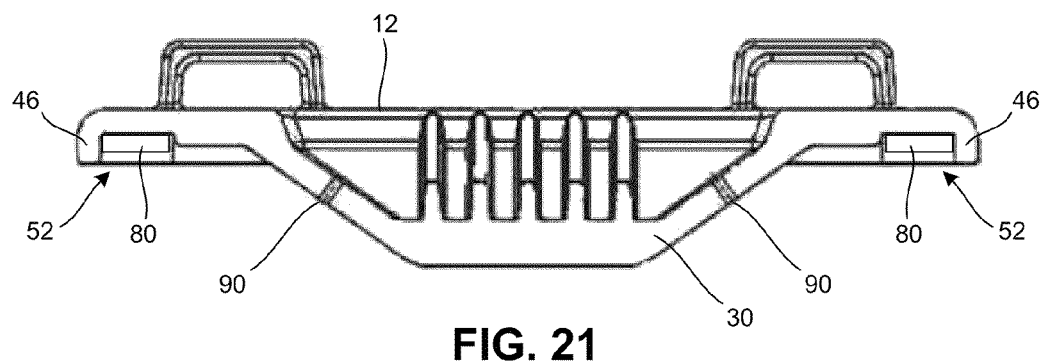
FIG. 21 is a cross-section of another exemplary embodiment of a cooling head.

To enhancing sealing of the cooling head 12 with the rim 50, a sealing material may be placed between the rim 50 and the head 12. For example, in the embodiment of FIG. 21, a sealing member 80 is retained in the channel 52. The sealing member 80 may alternatively be retained by the material container 14, or placed on the material container 14 prior to positioning of the cooling head 12 to cover the material container 14. The sealing member 80 may be made of ceramic material, such as ceramic rope or a ceramic fiber mat, and may deform slightly between the head 12 and container 14. The sealing member 80 is shown in FIG. 21 as being rectangular. It will be appreciated that other shapes are possible.

The cooling head 12 of FIG. 8 is intended for use when dross is placed in the material container 14, but is not pressed with a dross press assembly. Rather, the cooling head 12 is placed on the material container 14 and unpressed dross. The protrusion 48 may be sized to have a penetration height and/or penetration volume that is smaller than the penetration height and/or penetration volume of a press head from a conventional dross press assembly. In this embodiment, the cooling head 10 may be used as a "dead" weight that is positioned, and possibly forced downward into the dross, with a fork truck. The cooling head 10 may serve to enhance dross cooling, reduce thermiting and/or oxidizing of the aluminum in the dross (by removing heat and by encapsulation to limit oxygen supply), promote aluminum draining into the collection pan 20, and reduce fume release and dusting.

Figure 9A:
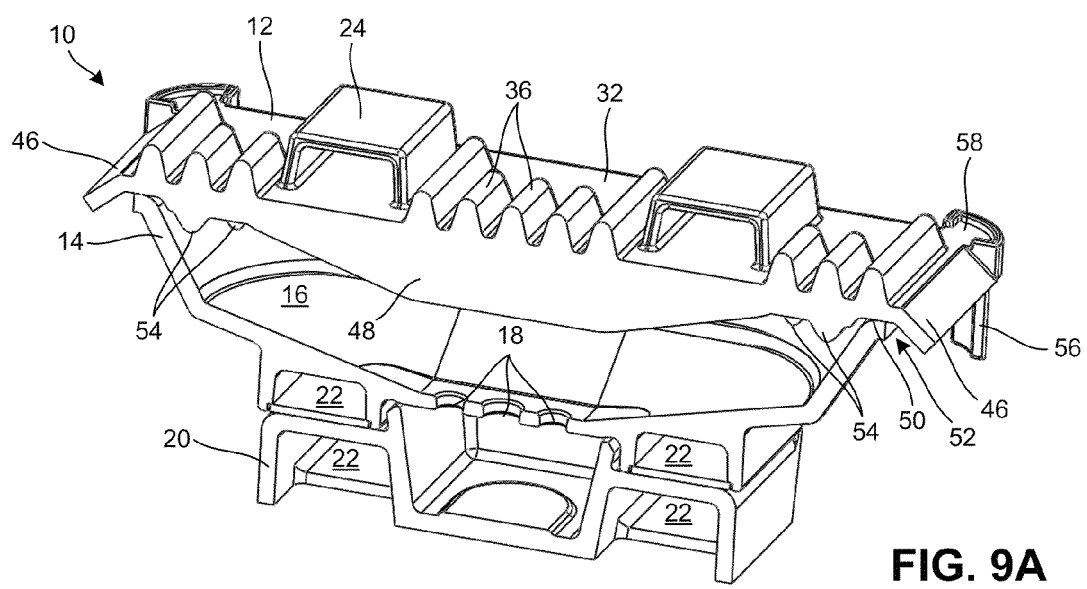
FIG. 9A is an oblique view showing a cross-section of a cooling system in accordance with another exemplary embodiment of the present invention.
Figure 9B:
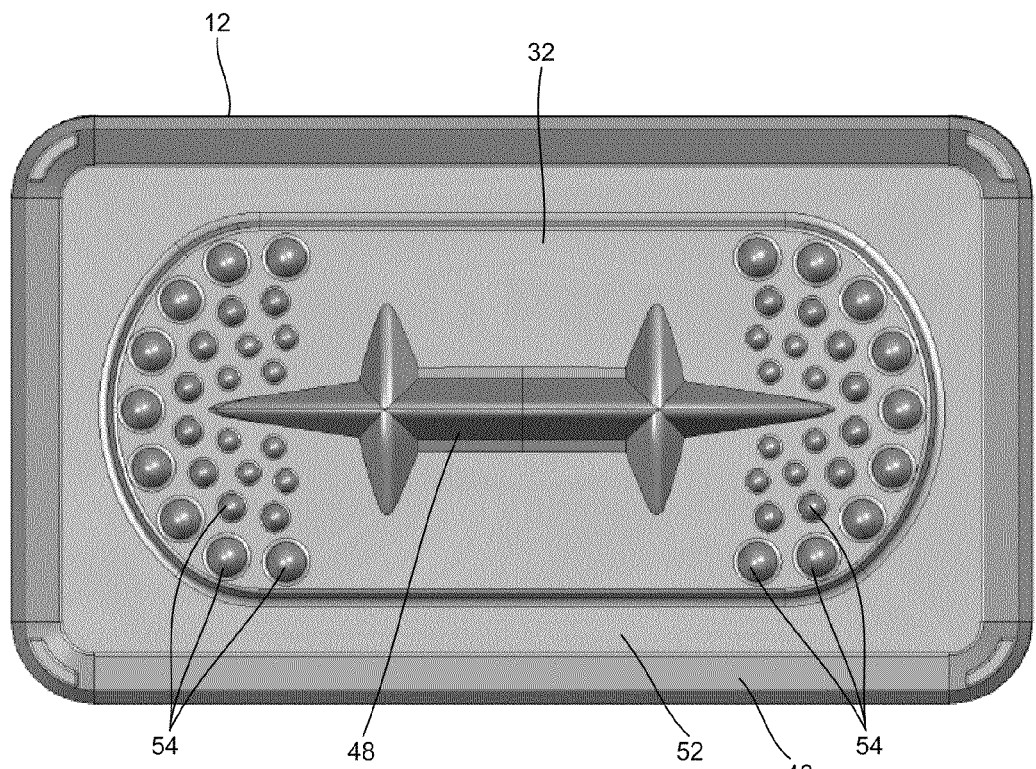
FIG. 9B is a bottom view of a cooling head that forms part of the cooling system of FIG. 9A.

Turning now to FIGS. 9A and 9B, shown is another embodiment of the cooling system 10. Similar to the foregoing cooling systems 10, the cooling system 10 of FIGS. 9A and 9B includes a cooling head 12, a material container 14, and a collection pan 20. Features that the cooling system 10 of FIGS. 9A and 9B has in common with the foregoing cooling systems 10 will not be described in detail.

Similar to the cooling head 12 of FIG. 8, the cooling head 12 of FIGS. 9A and 9B includes a generally planar plate that forms the upper portion 32. The upper portion 32 does not have a depression or well that forms the protrusion. Rather, the cooling head has a downward protrusion 48 that projects from a lower side of the upper portion. The protrusion 48, which is preferably solid, makes thermal contact with the material. In addition, and similar to the above-described cooling heads 12, the cooling head 12 may include ribs 36 and tubular members 24 that extend upward from an upper side of the upper portion 32. Since a well is not present in the cooling head 12, the ribs 34 may traverse a central portion of the cooling head 12.

Engagement of the cooling head 12 of FIGS. 9A and 9B against an upper rim 50 of the material container 14 may form a seal and may serve to encapsulate the dross in a volume formed by the material container 14 and cooling head 12. The encapsulation and sealing may reduce fume release and dusting. The cooling head 12 may be structurally arranged to form the seal. For example, in the illustrated embodiment, the lower side of the upper portion 32 may include a channel 52 around the perimeter of the cooling head 12 into which the rim 50 is received. The cooling head 12 may be larger than the material container 14 in the lengthwise and widthwise directions so that the upper portion 32 overhangs the material container 14 with overhanging portions 46. The overhanging portions 46 may be bent downward to establish the channel 52 to the inside of the overhanging portions 46, such as between the overhanging portions 46 and a thicker portion of the plate-like upper portion 32 in similar manner to the embodiment of FIG. 8.

The cooling head 12 may include legs 56 to allow stacking of plural cooling heads 12 upon one another when not in use. In one embodiment, the legs 56 are formed separately from the cooling head 12 and may slide over receiving lugs 58 of the cooling head 12. Alternatively, the legs may be cast or otherwise integrally formed with the cooling head 12 so as to form a monolithic structure, such as in the exemplary embodiment of FIG. 20. When stacked, lower ends of the legs 56 may rest on respective upper surfaces of the lugs 58 (or an upper surface of the upper portion 32) of an underlying cooling head 12.

In one embodiment, the cooling head 12 of FIGS. 9A and 9B is intended for use when dross is placed in the material container 14, and then pressed with a dross press assembly. After the dross is pressed, the cooling head 12 is placed on the material container 14 and pressed dross. The protrusion 48 may be sized to have a penetration height and/or penetration volume that is the same as or approximately the same as the penetration height and/or penetration volume of a press head from a dross press assembly. The configuration of the under side of the cooling head 12 is preferably arranged to closely fill the indentation formed in the dross by the press assembly. In this manner, thermal contact may be made between the dross and the cooling head 12, but the cooling head 10 may be used as a "dead" weight that is positioned with a fork truck. The cooling head 10 may serve to enhance dross cooling, reduce thermiting and/or oxidizing of the aluminum in the dross (by removing heat and by encapsulation to limit oxygen supply), promote aluminum draining into the collection pan 20, and reduce fume release and dusting.

In one embodiment, the cooling head may include supplemental projections 54 that are configured to make contact with and embed themselves into loose dross material that may be present after pressing.

With additional reference to FIGS. 10 through 15, illustrated are various phases of compressing and cooling hot aluminum dross using a cooling and compression system. The illustrated system shows the simultaneous compression and cooling of two containers 14 of aluminum dross 60. It will be appreciated that the below described apparatus and methods may apply to compressing and cooling one container 14 of dross 60 (or other material) at one time, or compressing and cooling more than two containers 14 of dross 60 (or other material) at one time. Also, features of the cooling and compression system that are common with the foregoing cooling systems 10 will not be described in detail.

The system uses a cooling head as a press head. This head is not permanently affixed in a press assembly. That is, the head is separate from the press assembly and, although the head interacts with the press assembly during pressing, the head is not mechanically connected to, affixed or attached to, touching and/or in direct contact with the press assembly prior to pressing or after pressing. When compression is completed, the dross container is removed from the compression assembly with the head in place as a cover to the container. The container and head may be set aside for further cooling. The head and the cooled dross may be removed from the container, after which the head and container may be reused.

In a conventional compression system, after compression, the compression head is brought out of contact with the compressed dross and the container is removed from the compression assembly. At this time, the dross is exposed to the atmosphere through the open top of the dross container. The system of FIGS. 10-15 leaves the head in place over the dross after compression. Therefore, less exposure of the dross to the atmosphere occurs and, as a result, less thermiting of the dross may occur after compression. In addition, the head and dross will be in close conformity with one another following the compression phase since the head itself is used to compress the dross.

Figure 10:
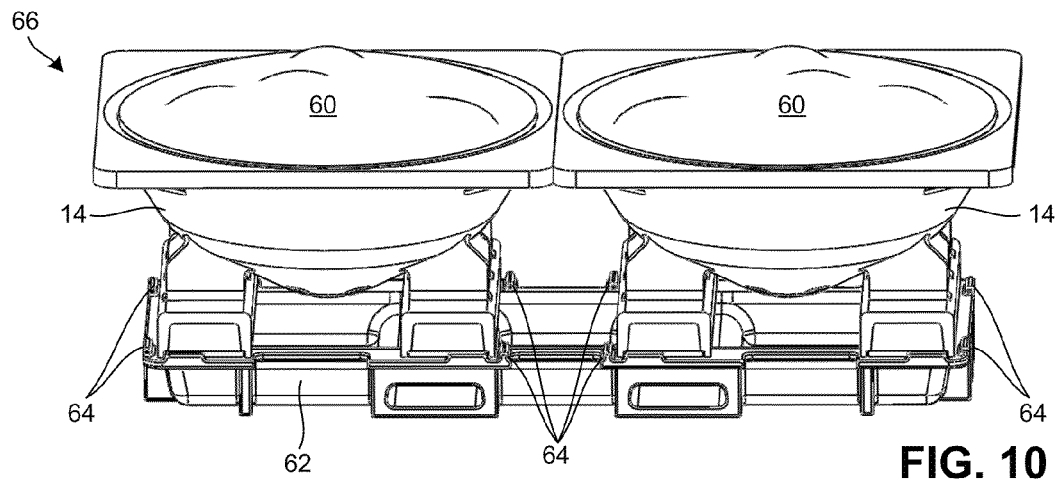
FIGS. 10 through 15 illustrate various phases of compressing and cooling dross using a cooling system and compression apparatus according to additional embodiments of the present invention.

In FIG. 10, a first phase of compressing and cooling dross is illustrated. In this phase, hot aluminum dross 60 is skimmed into the material containers 14. In the illustrated embodiment, the containers 14 are a set of dross pans. The dross pans may be integral with one another or separate units. The containers 14 may be placed upon respective receptacles 16. In the illustrated embodiment, the receptacles 16 for the two containers 14 are integrally formed to form a unitary drain pan 62 (also referred to as a sow mold). Also, the containers 14 may be secured to the drain pan 62 with latching devices 64. The containers 14 and drain pan 62 will be collectively referred to as a dross pan set 66. The containers 14 and drain pan 62 may be made from cast alloy steel, grey iron or a ceramic material, and may be configured to optimize cooling of the dross and aluminum recovered through draining into the drain pan 62.

Figure 11:
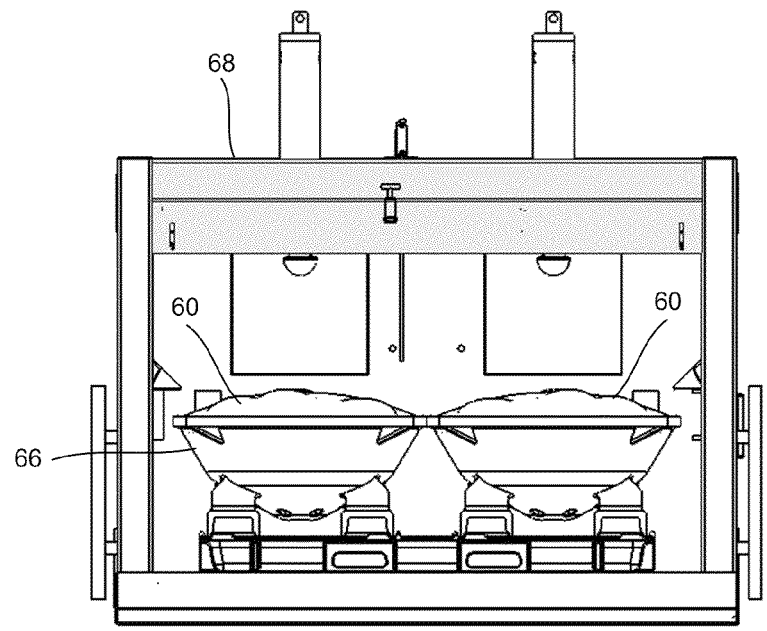

In FIG. 11, a second stage of compressing and cooling dross is illustrated. In this phase, a dross press door (not shown) of a press assembly 68 may be opened. A forklift truck may be used to position the drain pan set 66 into the press assembly 68.

Figure 12:
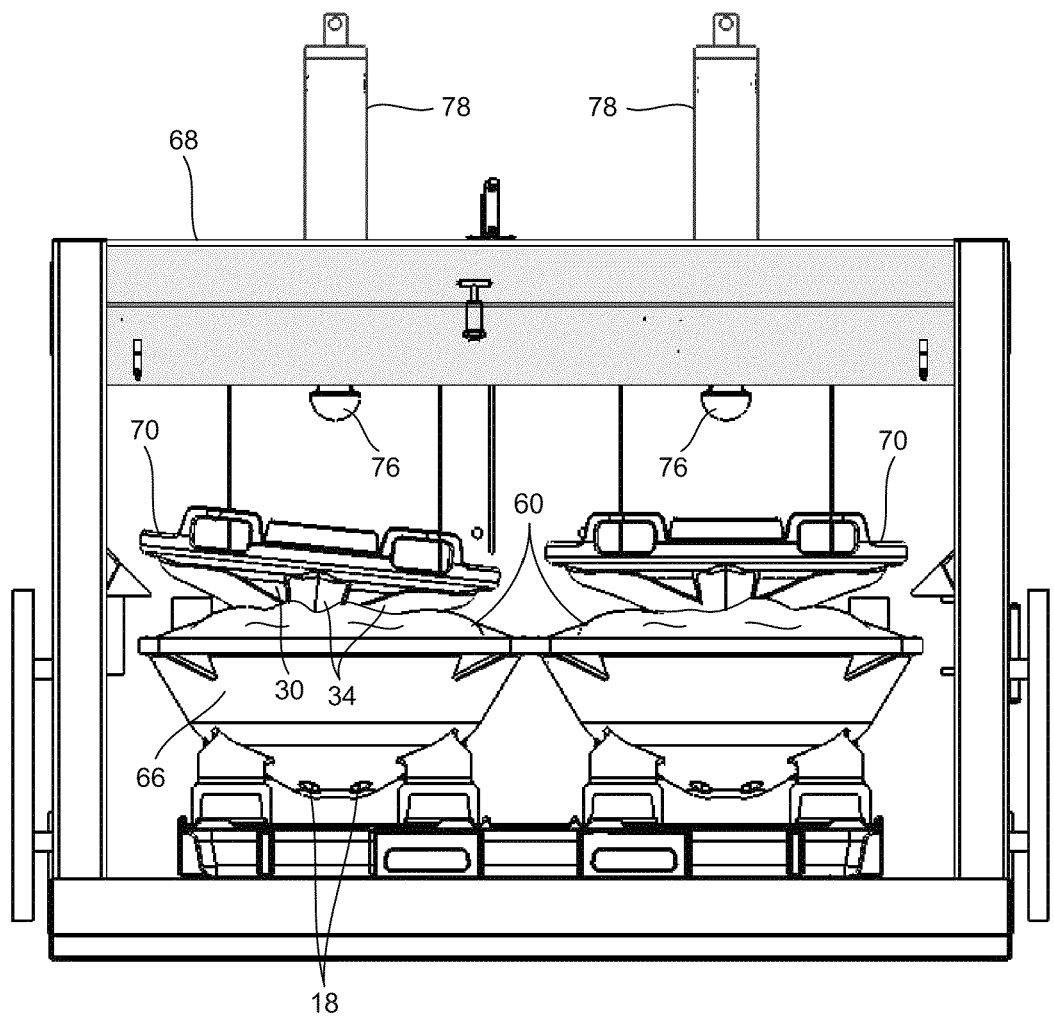

In FIG. 12, a third stage of compressing and cooling dross is illustrated. In this phase, a compression and cooling head 70 is placed on the dross in each container 14. The head 70 may include a protrusion 30 that is forced into the dross 60 by pressing action of the dross press assembly 68 (discussed below). In the illustrated embodiment, the protrusion 30 includes ribs 34.

Figure 15:
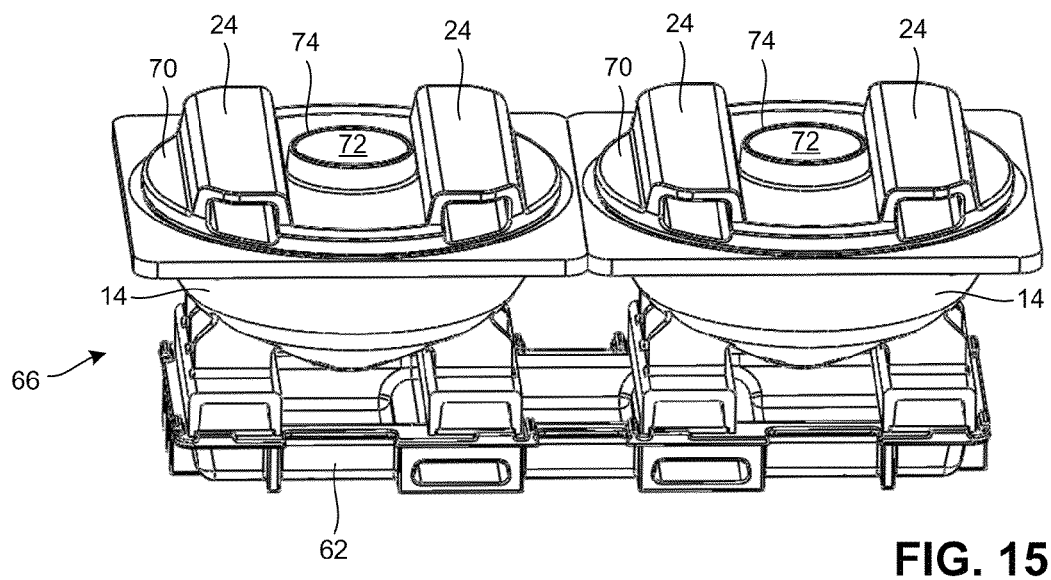

With additional reference to FIG. 15, each head 70 may be shaped to correspond to the shape of the container 14. In one embodiment, following pressing, a perimeter edge of the head 70 may seat itself slightly into the dross receptacle 16 of the container 14. In the illustrated embodiment, the perimeter edge of the head 70 may be considered a seating surface. The seating surface may be arranged in other manners. For instance, the seating surface may be a rib or other projection that inscribes the protrusion 30, or may be a channel similar to the channel 52 of the heads 12 illustrated in FIGS. 8 and 9.

Each head 70 may include tubular members 24 to allow movement by a forklift truck. Also, the tubular members 24 may serve to assist in dissipating heat. Although the illustrated heads 70 do not include cooling ribs on an upper surface of the head 70, ribs may be present. The head 70 may be made from cast alloy steel, grey iron or a ceramic material.

A hemispherical well 72 may be present in the center of the upper surface of the head 70. The well 72 may be surrounded by a ridge 74. The well 72 is shaped to cooperate with a head 76 of a hydraulic or pneumatic cylinder 78 (or other force applicator, e.g., screw assembly) of the press assembly 68. For example, the head 76 may be hemispherical. As used herein for the well 72 and the head 76, the term hemispherical includes shapes that are a segment of a sphere (e.g., less than or more than exactly one half of a sphere); a spherical sector (or spherical cone); any other conoid or portion thereof, including spheres, ellipsoids, oblate spheroids, prolate spheroids, and catenoids; a pyramid but with a substantially rounded end (e.g., akin to the well/protrusion of the head 10 shown in FIGS. 1-4); and so forth.

In this manner, the head 70 need not be placed level on the dross 60. For instance, the left-hand head 70 in FIG. 12 is placed slightly askew on the dross 60. As the head 76 and cylinder 78 are used to force the head 70 downward into the dross 60 by pressing the head 76 into the well 72, the head 70 will self align and seat itself with respect to the container 14. During this action, and due to the cooperating shapes of the well 72 and head 76, pivoting of the head 70 may occur with respect to the head 76.

The head 70 is configured to squeeze the dross 60 to push molten aluminum contained in the dross 60 through the openings 18 in the bottom of the receptacle 16 and into the collection pan 20. The head 70 is further configured to simultaneously cool the dross 60 and encapsulate the dross 60 to extinguish any thermiting material in the dross 60.

Continuing to refer to FIG. 12, once the head 70 is positioned on the dross 60, the door of the dross press assembly 68 may be closed. As indicated, the door is not shown in the attached figures. Omitting the door for purposes of this document facilitates visualization of the operation of the cooling and compression system.

Figure 13:
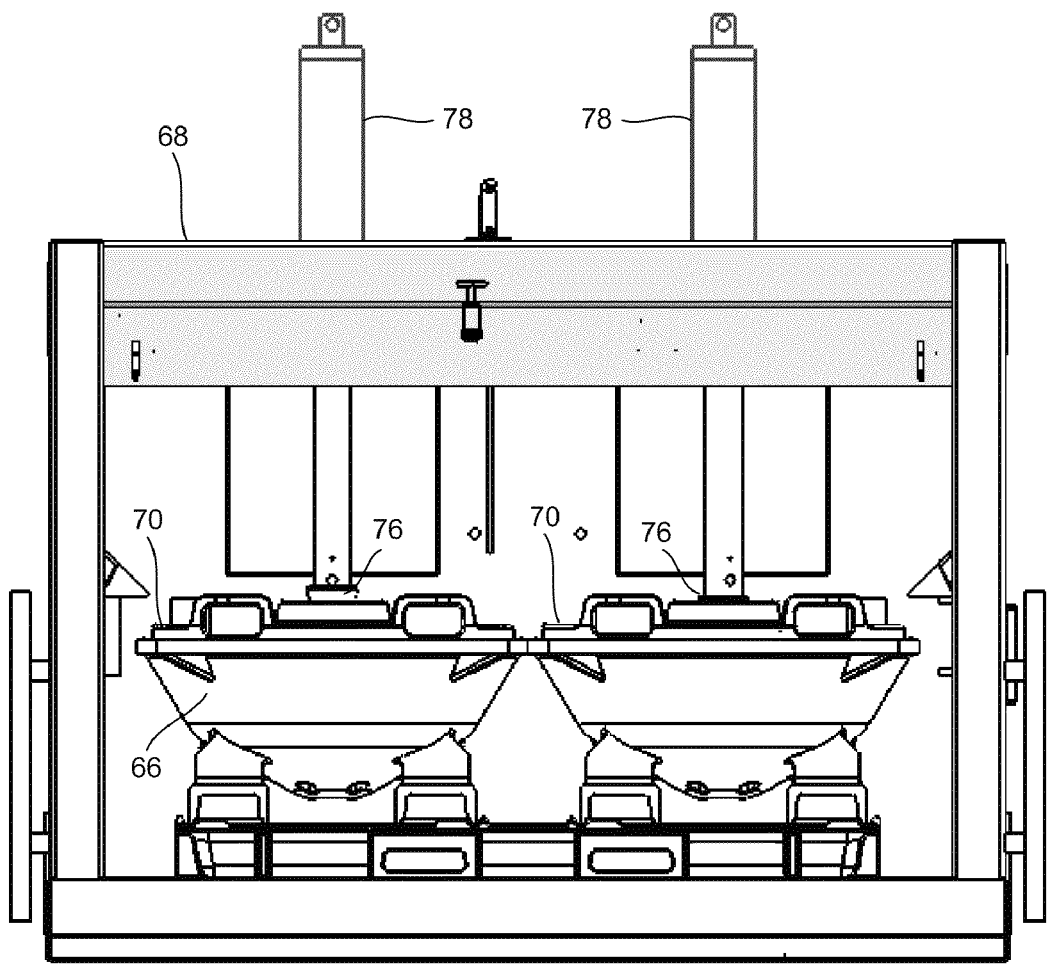

In FIG. 13, a fourth stage of compressing and cooling dross is illustrated. In this phase, the cylinders 78 force the heads 76 into contact with the respective heads 70 that, in turn, are forced into the dross 60. As indicated, this action results in forcing aluminum through the openings 18 and into the collector pan 20. Also, this action results in forcing aluminum to the outside of the dross 60 and against the walls of the receptacle 16 and protrusion 30. This aluminum forms a metallic "skin" around the dross, which aids in blocking air contact with the dross and further reduces oxidation of the dross.

Figure 14:
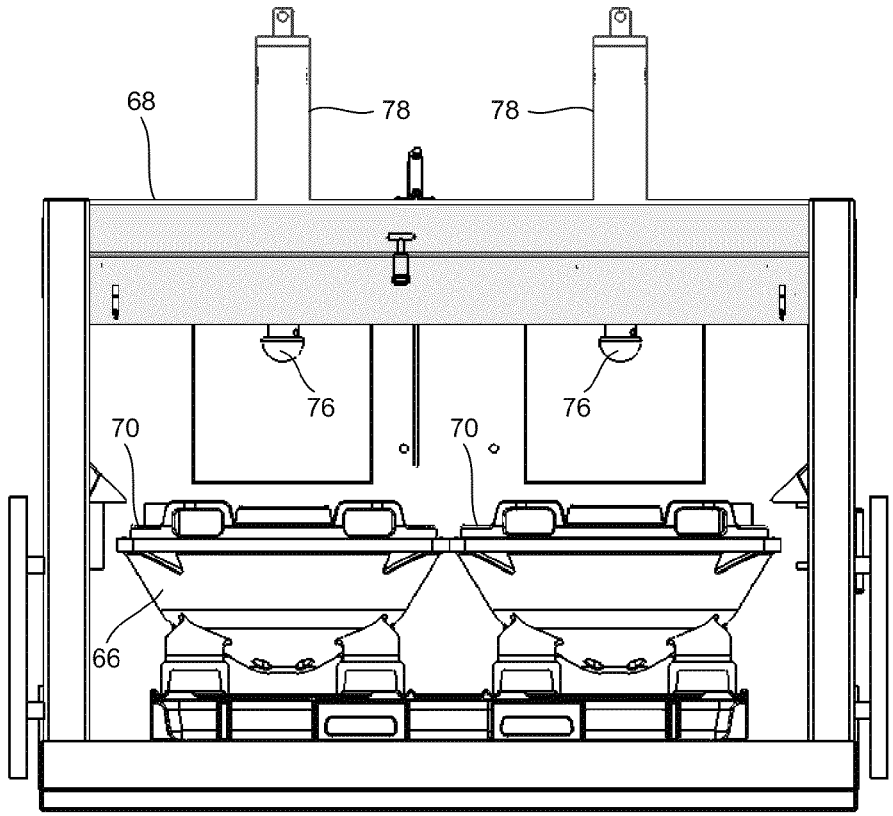

In FIG. 14, a fifth stage of compressing and cooling dross is illustrated. When the pressing stage is completed, the cylinders 78 and accompanying heads 76 may be retracted. In one embodiment, pressing may be considered complete when maximum compression of the dross 60 is achieved and the head 70 becomes seated in the receptacle 16. When the cylinders 78 are fully retracted, the door of the dross press assembly 68 may be opened.

Then, as illustrated in FIG. 15, the dross pan set 66 with heads 70 may be removed from the dross press assembly 68 for further cooling. After removal of the dross pan set 66 from the dross press assembly 68, the pressing steps may be repeated with a different dross pan set 66 and heads 70.

In one embodiment, the further cooling is achieved by allowing the dross pan set 66 with heads 70 in place to stand. In addition, cooling air may be directed at the dross pan set 66.

In still other embodiments, a cooling assembly may be brought into contact with the head 70. For instance, a liquid-based (e.g., water or oil) heat exchanger may be inserted into the well 72.

Once the compressed dross 60 is sufficiently cooled, the heads 70 may be removed using a forklift truck. Then, the material containers 14 may be removed from the drain pan 62 and inverted to remove the cooled dross 60. Next, the drain pan 62 may be inverted to remove any recovered aluminum. The components may be reused to process additional dross.

Figure 16:
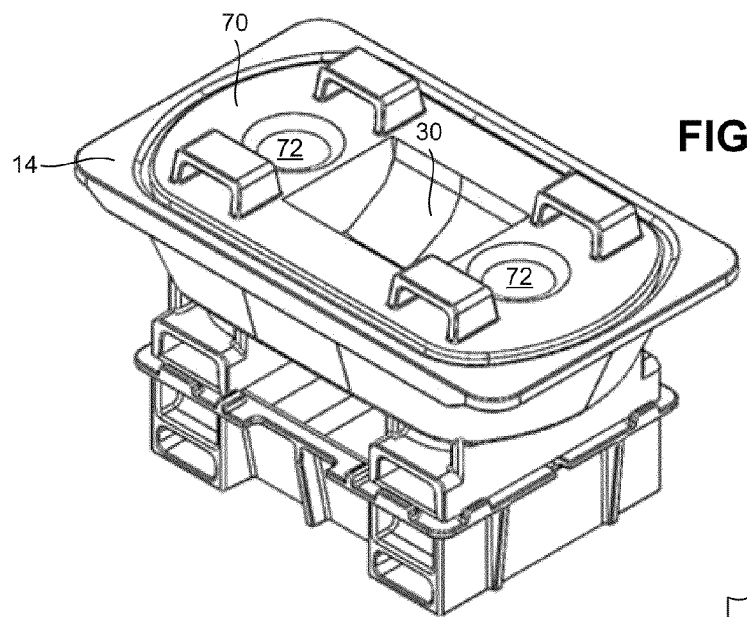
FIG. 16 is perspective view of an exemplary cooling head that has been pressed into a seating position with respect to a material container.

With additional reference to FIG. 16, another head 70 embodiment is shown. In this embodiment, the head 70 is elongated so that the width of the head is greater than the depth of the head 70. The head 70 has a pair of spaced apart wells 72 for receiving respective compression heads 76. In the illustrated embodiment, a protrusion 30 is disposed between the wells 72. The protrusion 30 may be solid or, as illustrated, form an accompanying well.

Figure 17:
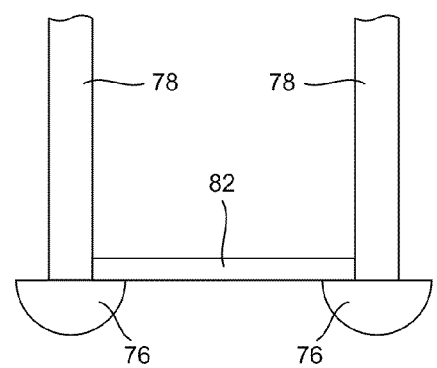
FIG. 17 is a front view of a portion of an exemplary press assembly for use with the cooling head of FIG. 16.

Similar to the embodiments of FIGS. 10-15, the head 70 of FIG. 16 may be forced with the cylinders 78 and heads 76 into a seating position with respect to a container 14 so that a perimeter edge of the head 70 is seated into the dross receptacle 16 of the container 14. With additional reference to FIG. 17, rods of the pair of cylinders 78 and/or the pair of heads 76 may be connected with a coupling member 82. The coupling member 82 may be configured to dissipate force across the top of the head 70. The coupling member 82 may be configured to contact the top of the head 70 during compression or may be configured to be spaced apart from the head 70 during compression.

Figure 18:
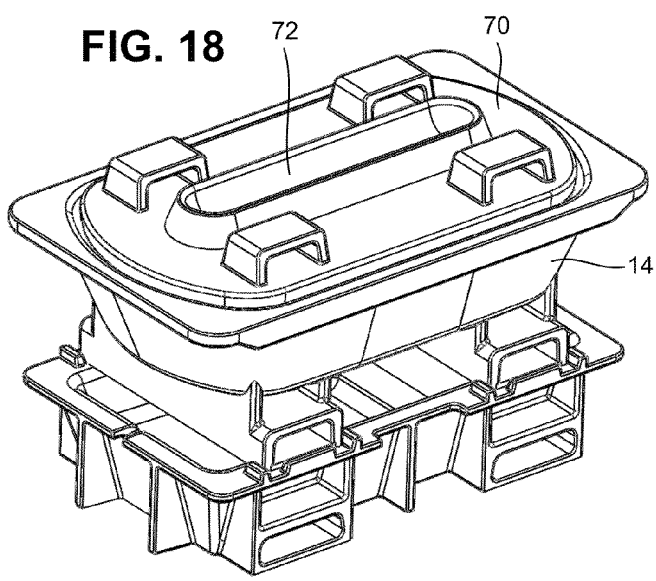
FIG. 18 is perspective view of another exemplary cooling head that has been pressed into a seating position with respect to a material container.
Figure 19:
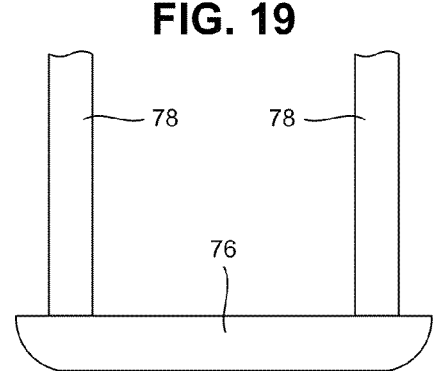
FIG. 19 is a front view of a portion of an exemplary press assembly for use with the cooling head of FIG. 18.

FIG. 18 illustrates another elongated head 70 that is configured to be pressed into a seating position with respect to a container 14 so that a perimeter edge of the head 70 is seated into the dross receptacle 16 of the container 14. In the embodiment of FIG. 18, the head 70 has a single well 72, which may be elongated as shown in the illustrated embodiment. The head 70 of FIG. 18 may be pressed into the container 14 with a single cylinder 78 and head 76 or with a pair of cylinders 78 and heads 76 (e.g., with the apparatus of FIG. 17). In the case where the head 70 is pressed with a pair of cylinders 78 and heads 76, the pair of cylinders 78 and/or the pair of heads 76 may be connected with the coupling member 82. In another embodiment, and as shown in FIG. 19, a pair of cylinders 78 may act upon a monolithic head 76 that is shaped to operatively interact with the well 72. It will be appreciated that the monolithic head 76 of FIG. 19 may be modified so as to interact with plural wells 72, such as the wells 72 in the embodiment of FIG. 16.

Figure 20:
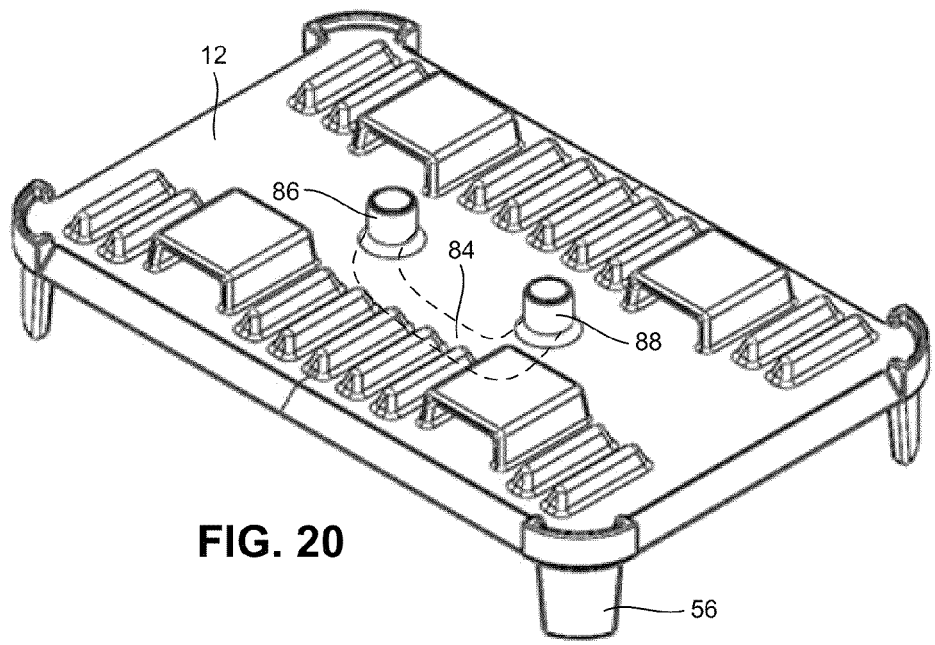
FIG. 20 is a perspective view of another exemplary embodiment of a cooling head.

With additional reference to FIG. 20, the head 12 or 70 may include a hollow passage 84 through which a cooling fluid, such as air, is circulated. The passage 84 may be connected to an inlet 86 and an outlet 88. Pipes or flexible hoses may be attached to the inlet 86 and output 88 to act as a source of the cooling fluid and as an exhaust for the cooling fluid, respectively. In one embodiment, a header assembly that forms part of a cooling station may supply and exhaust cooling fluid to plural heads 12 or 70.

With additional reference to FIG. 21, inert gas (e.g., argon or nitrogen) may be injected into spaces between the dross and head 12 or 70. In one embodiment, holes 90 may be formed in the head 12 or 70 and supply hoses may be connected to the holes 90 to deliver the gas. In one embodiment, the holes 90 may be threaded to receive mating couplers of the hoses, or plugged in the event that inert gas is not used. The inert gas may assist in extinguishing any thermiting or burning of aluminum in the dross. In this embodiment, the head 12 or 70 is used as a cover to retain the inert gas with respect to the dross. In addition, the head 12 or 70 makes physical and thermal contact with the dross to remove heat from the dross by conduction. Also, the head 12 or 70 may compress or deform the dross.

Although the invention has been shown and described with respect to certain embodiments, equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component that performs the specified function of the described component (e.g., that is functionally equivalent), even though not structurally equivalent to the disclosed component which performs the function in the herein illustrated exemplary embodiments of the invention. Also, control of all of the disclosed functions may be computerized and automated as desired. In addition, while a particular feature of the invention may have been disclosed with respect to only one embodiment, such feature may be combined with one or more other features as may be desired and advantageous for any given or particular application.

What is claimed is:

1. A method of cooling aluminum dross, comprising:
placing the dross into a receptacle of a material container; and
placing a cooling head on top of the dross so that a downwardly projecting portion of the cooling head engages the dross and locally deforms the dross under the weight of the cooling head; wherein:
the cooling does not include the use of a dross press assembly to exert mechanical force to the dross prior to placing the cooling head on the dross; and
the cooling head seals against the material container to at least partially encapsulate the dross and extinguish oxidation of the dross, and the seal is formed by engagement of an upper rim of the material container into a channel of the cooling head,
wherein the channel is formed inside the upper rim of the material container by a portion of the cooling head that is thicker than a portion of the cooling head located above the upper rim.

2. The method of claim 1, wherein heat from the dross is radiated from a plurality of ribs located on top of the cooling head to reduce thermiting of the dross.

3. The method of claim 2, further comprising directing cooling air across the top of the cooling head and between the ribs to cool the cooling head.

4. The method of claim 1, wherein the downward projection is formed by a well in an upper portion of the cooling head.

5. The method of claim 1, wherein the downward projection is solid and an upper portion of the cooling head is a solid planar plate.

6. The method of claim 1, wherein the cooling head is placed into position on the dross with a forklift truck and the forklift truck is used to apply downward pressure of the cooling head against the dross.

7. The method of claim 1, wherein the downwardly projecting portion includes ribs on a lower surface thereof.

8. The method of claim 1, wherein the cooling head is lowered into contact with the material with a lever arm.

9. The method of claim 1, further comprising collecting a liquid component of the material that drains through holes of the material container with a collector pan.

10. The method of claim 1, further comprising vibrating the cooling head during deformation of the dross.

11. The method of claim 1, further comprising circulating cooling fluid through the head.

12. A method of cooling aluminum dross, comprising:
placing the dross into a receptacle of a material container; and
placing a cooling head on top of the dross so that a downwardly projecting portion of the cooling head engages the dross and locally deforms the dross under the weight of the cooling head; wherein:
the cooling does not include the use of a dross press assembly to exert mechanical force to the dross prior to placing the cooling head on the dross; and
the cooling head seals against the material container to at least partially encapsulate the dross and extinguish oxidation of the dross, and the seal is formed by engagement of an upper rim of the material container into a channel of the cooling head,
wherein a sealing member is disposed between the material container and the cooling head.

13. The method of claim 12, wherein the channel is formed outside the upper rim of the material container by downwardly projecting portions of the head that overhang the material container.

14. The method of claim 12, wherein the channel is formed inside the upper rim of the material container by a rib that projects downward from an upper portion of the cooling head.

15. A method of cooling aluminum dross, comprising:
placing the dross into a receptacle of a material container; and
placing a cooling head on top of the dross so that a downwardly projecting portion of the cooling head engages the dross and locally deforms the dross under the weight of the cooling head; wherein:
the cooling does not include the use of a dross press assembly to exert mechanical force to the dross prior to placing the cooling head on the dross; and
the cooling head seals against the material container to at least partially encapsulate the dross and extinguish oxidation of the dross, and the seal is formed by engagement of an upper rim of the material container into a channel of the cooling head,
further comprising injecting inert gas between the cooling head and the dross.

16. A method of cooling aluminum dross, comprising:
placing the dross into a receptacle of a material container;
pressing the dross with a dross press head that is part of a dross press assembly so that an indentation corresponding to a shape of the dross press head is formed in the dross; and
placing a cooling head on top of the dross so that a downwardly projecting portion of the cooling head engages the pressed dross; wherein:
the cooling head is shaped to make physical and thermal contact with a surface of the indentation in the dross; and
the cooling head seals against the material container to at least partially encapsulate the dross and extinguish oxidation of the dross, and the seal is formed by engagement of an upper rim of the material container into a channel of the cooling head.

17. The method of claim 16, wherein heat from the dross is radiated from a plurality of ribs located on top of the cooling head to reduce thermiting of the dross.

18. The method of claim 17, further comprising directing cooling air across the top of the cooling head and between the ribs to cool the cooling head.

19. The method of claim 16, wherein the downward projection is formed by a well in an upper portion of the cooling head.

20. The method of claim 16, wherein the downward projection is solid and an upper portion of the cooling head is a solid planar plate.

21. The method of claim 16, wherein the channel is formed outside the upper rim of the material container by downwardly projecting portions of the head that overhang the material container.

22. The method of claim 16, wherein the channel is formed inside the upper rim of the material container by a rib that projects downward from an upper portion of the cooling head.

23. The method of claim 16, wherein the channel is formed inside the upper rim of the material container by a portion of the cooling head that is thicker than a portion of the cooling head located above the upper rim.

24. The method of claim 16, further comprising vibrating the cooling head during deformation of the dross.

25. The method of claim 16, wherein a sealing member is disposed between the material container and the cooling head.

26. The method of claim 16, further comprising injecting inert gas between the cooling head and the dross.

27. The method of claim 16, further comprising circulating cooling fluid through the head.

28. A method of cooling aluminum dross, comprising:
placing the dross into a receptacle of a material container;
placing the material container containing the dross into a dross press assembly;
placing a compression and cooling head that is separate from the dross press assembly onto the dross;
bringing a head of a force applicator of the dross press assembly into contact with the compression and cooling head and compressing the dross by downwardly forcing the force applicator head against the compression and cooling head so that the compression and cooling head travels into the dross and into a seating position in the receptacle, wherein a shape of the force applicator head cooperates with a shape of a receiving structure of the compression and cooling head to allow the compression and cooling head to self align with the dross and material container during compression of the dross;
removing the material receptacle with seated compression and cooling head from the dross press assembly after compressing; and
cooling the dross while the compression and cooling head is in the seated position.

29. The method of claim 28, wherein the cooling includes allowing the material receptacle with seated compression and cooling head to stand.

30. The method of claim 29, wherein the cooling includes directing an air flow toward the material receptacle with seated compression and cooling head.

31. The method of claim 28, wherein the seated compression and cooling head extinguishes oxidation of the dross.

32. The method of claim 28, wherein thermiting of the dross is reduced by encapsulating the dross with the material container and the seated compression and cooling head.

33. The method of claim 28, wherein the receiving structure is a hemispherical well and the force applicator head is hemispherical.

34. The method of claim 28, further comprising collecting liquid aluminum that drains through holes of the material container with a collector pan.

35. The method of claim 34, wherein the material container travels with the collector pan during placing the material container into the dross press assembly; removing the material receptacle with seated compression and cooling head from the dross press assembly after compressing; and cooling the dross while the compression and cooling head is in the seated position.

* * * * *